US012332715B2

(12) United States Patent
Matsuda et al.

(10) Patent No.: US 12,332,715 B2
(45) Date of Patent: *Jun. 17, 2025

(54) INFORMATION PROCESSING APPARATUS AND INFORMATION PROCESSING METHOD

(71) Applicant: SONY GROUP CORPORATION, Tokyo (JP)

(72) Inventors: Shigeto Matsuda, Tokyo (JP); Yu Shigeta, Tokyo (JP); Tetsu Eto, Tokyo (JP); Daisuke Oyamada, Tokyo (JP); Tatsuya Ooka, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/622,314

(22) Filed: Mar. 29, 2024

(65) Prior Publication Data

US 2024/0241562 A1 Jul. 18, 2024

Related U.S. Application Data

(63) Continuation of application No. 17/911,123, filed as application No. PCT/JP2021/008981 on Mar. 8, 2021, now Pat. No. 11,971,766.

(30) Foreign Application Priority Data

Mar. 18, 2020 (JP) ................. 2020-048392

(51) Int. Cl.
*G06F 1/32* (2019.01)
*G06F 1/3209* (2019.01)
*G06F 1/3231* (2019.01)

(52) U.S. Cl.
CPC .......... *G06F 1/3209* (2013.01); *G06F 1/3231* (2013.01)

(58) Field of Classification Search
CPC .... G06F 1/3209; G06F 1/3231; G06F 1/3206; G06F 1/3228; G06F 1/3287; Y02D 10/00; G16Y 40/10

(Continued)

(56) References Cited

U.S. PATENT DOCUMENTS

| 5,708,821 A | 1/1998 | Takikita |
| 5,781,782 A | 7/1998 | Tachikawa |

(Continued)

FOREIGN PATENT DOCUMENTS

| JP | 08-087361 A | 4/1996 |
| JP | 2016-082252 A | 5/2016 |

(Continued)

OTHER PUBLICATIONS

International Search Report and Written Opinion of PCT Application No. PCT/JP2021/008981, issued on May 25, 2021, 06 pages of English Translation, 07 pages of ISRWO.

(Continued)

*Primary Examiner* — Chun Cao
(74) *Attorney, Agent, or Firm* — CHIP LAW GROUP (57) ABSTRACT

The information processing apparatus includes a computation processing circuit of which a state is capable of being switched at least between an active state in which power is consumed, and a no-power-usage state in which power is not consumed, an event detection module that detects a first event used to shift the state of the computation processing circuit from the no-power-usage state to the active state, a power isolation circuit that isolates power of the event detection module from power of the computation processing circuit in the no-power-usage state, and an isolation canceling circuit that cancels, in the active state, the isolation performed by the power isolation circuit.

20 Claims, 9 Drawing Sheets (58) Field of Classification Search
USPC .......................................................... 713/323
See application file for complete search history.

(56) References Cited

U.S. PATENT DOCUMENTS

| | | | |
|---|---|---|---|
| 9,063,731 B2 * | 6/2015 | Heo | G06F 1/1694 |
| 11,106,270 B2 * | 8/2021 | Mayer | G06F 1/3228 |
| 11,971,766 B2 * | 4/2024 | Matsuda | G16Y 40/10 |
| 2016/0105581 A1 | 4/2016 | Hikichi | |
| 2018/0157306 A1 | 6/2018 | Kohara | |
| 2019/0235565 A1 | 8/2019 | Izumi et al. | |
| 2021/0141438 A1 | 5/2021 | Seto | |

FOREIGN PATENT DOCUMENTS

| | | |
|---|---|---|
| JP | 2016-178594 A | 10/2016 |
| WO | 2018/116666 A1 | 6/2018 |

OTHER PUBLICATIONS

Notice of Allowance for U.S. Appl. No. 17/911,123, issued on Dec. 19, 2023, 05 pages.
Non-Final Office Action for U.S. Appl. No. 17/911,123, issued on Aug. 16, 2023, 09 pages.
International Preliminary Report on Patentability of PCT Application No. PCT/JP2021/008981, issued on Sep. 29, 2022, 06 pages of English Translation and 04 pages of IPRP.

* cited by examiner

Source of map:
Website of Geospatial Information Authority of Japan
https://maps.gsi.go.jp/

FIG.9

Source of map:
Website of Geospatial Information Authority of Japan
https://maps.gsi.go.jp/

FIG.10

INFORMATION PROCESSING APPARATUS AND INFORMATION PROCESSING METHOD

CROSS REFERENCE TO RELATED APPLICATIONS

The present application is a continuation application of U.S. patent application Ser. No. 17/911,123 filed Sep. 12, 2022, which is a U.S. National Phase of International Patent Application No. PCT/JP2021/008981 filed Mar. 8, 2021, which claims priority benefit of Japanese Patent Application No. JP 2020-048392 filed in the Japan Patent Office on Mar. 18, 2020. Each of the above-referenced applications is hereby incorporated herein by reference in its entirety.

TECHNICAL FIELD

The present technology relates to an information processing apparatus, such as an Internet of Things (IOT) apparatus, in which there is a need to achieve power savings, and an information processing method.

BACKGROUND ART

A system has been discussed that collects and manages a state (such as the environment, a motion, and a location) of a monitoring-and-observation target through a network using an Internet of Things (IOT) apparatus. When states of the monitoring-and-observation target that exist in a distributed manner are desired to be picked up, there is a need for a battery-operated IoT apparatus. For this reason, power savings are desired to be achieved in the IoT apparatus. The mainstream of a technology that makes it possible to achieve power savings in an IoT apparatus is a technology that causes a system CPU to be in a standby state as appropriate and causes the state of the system CPU to be shifted from the standby state to an active state as necessary (refer to Patent Literature 1).

CITATION LIST

Patent Literature

Patent Literature 1: Japanese Patent Application Laid-open No. 8-087361

DISCLOSURE OF INVENTION

Technical Problem

However, it is also necessary that a CPU in a standby state run a minimum necessary process to catch a trigger used to shift the state of the CPU from the standby state to an active state. Thus, power is also consumed by the system CPU in the standby state. This results in an obstacle to prolong a battery life of a battery-operated IoT apparatus.

Thus, it is an object of the present technology to provide an information processing apparatus with a greater power-saving capability.

Solution to Problem

In order to solve the issue described above, an information processing apparatus according to an embodiment of the present technology includes a computation processing circuit of which a state is capable of being switched at least between an active state in which power is consumed, and a no-power-usage state in which power is not consumed; an event detection module that detects a first event used to shift the state of the computation processing circuit from the no-power-usage state to the active state; a power isolation circuit that isolates power of the event detection module from power of the computation processing circuit in the no-power-usage state; and an isolation canceling circuit that cancels, in the active state, the isolation performed by the power isolation circuit.

The information processing apparatus according to the embodiment of the present technology may be configured such that, when the first event is detected by the event detection module, the computation processing circuit is turned on, and the isolation canceling circuit cancels the isolation performed by the power isolation circuit.

In the information processing apparatus according to the embodiment of the present technology, the event detection module may be a communication module used to communicate with a network, and the event detection module may be configured to determine reception of a request as the first event, the request being a request that is received from a side of the network and is a request for data generated by the computation processing circuit, or a request that external data on the network be acquired.

The communication module may hold at least setting information that is used for communication and is set by the computation processing circuit, and changeable information that dynamically changes in the communication module, and the communication module may be configured to provide the setting information and the changeable information to the computation processing circuit when the state of the computation processing circuit is shifted from the no-power-usage state to the active state.

The event detection module may include a sensor that detects a motion, and may be configured to determine, as the first event, detection of a motion that exhibits a value greater than a specified value.

The event detection module may be configured to determine, as the first event, an operation of a switch that is performed by a user.

The event detection module may be configured to determine a timer interrupt as the first event.

The event detection module may be configured to detect a second event used to shift the state of the computation processing circuit to the no-power-usage state, and the isolation canceling circuit may be configured to isolate, upon the detection of the second event, power of the event detection module from power of the computation processing circuit.

The communication module may be configured such that, when the communication module fails to get back into operation in a state in which the computation processing circuit is in the no-power-usage state, the communication module causes the state of the computation processing circuit to be shifted to the active state, and is caused to be restarted under the control of the computation processing circuit.

The computation processing circuit may be configured to determine a type of the occurring first event, and to perform processing corresponding to the determined type of the first event.

An information processing method according to another embodiment of the present technology includes isolating power of an event detection module from power of a computation processing circuit in a no-power-usage state in which power is not consumed, the computation processing circuit being a circuit of which a state is capable of being switched at least between an active state in which power is consumed, and the no-power-usage state, the event detection module detecting a first event used to shift the state of the computation processing circuit from the no-power-usage state to the active state; and, when the first event is detected by the event detection module, turning on the computation processing circuit to cause the state of the computation processing circuit to be shifted to the active state, and canceling the isolation.

MODE(S) FOR CARRYING OUT THE INVENTION

Embodiments according to the present technology will now be described below.

First Embodiment

In the present embodiment, the present technology is applied to an IoT apparatus.

Outline of IoT Apparatus of Present Embodiment

Figure 1:
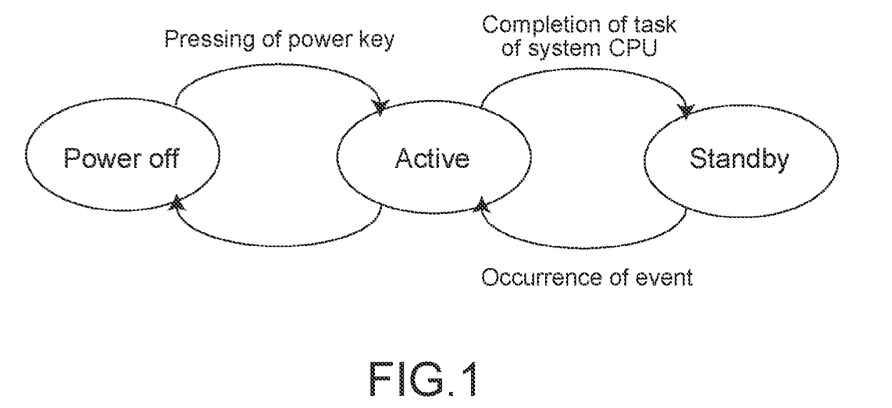
FIG. 1 illustrates a change in a state of a system CPU that is included in an IoT apparatus having a typical configuration.

There is a demand for an IoT apparatus that enables a long battery life such as a battery life on the order of several years, while ensuring a great processing capability. On the other hand, there is a need for a portable and mobile IoT apparatus for which a monitoring-and-observation target is, for example, a moving body. When a large-capacity battery is mounted to prolong a battery life of such a portable and mobile IoT apparatus, this results in difficulty in making the IoT apparatus smaller and lighter. As illustrated in FIG. 1, an IoT apparatus having a typical configuration enters a standby state when computation processing performed by a computation processing circuit such as a system CPU becomes unnecessary, such as upon completion of a task of the system CPU, and this results in a reduction in power consumption of the system CPU. However, the system CPU also consumes, in a standby state, minimum power (standby power) necessary for an operation performed to monitor the occurrence of an event, such as a motion detection performed by the IoT apparatus or reception of a data transmission/reception request made by a network side, that causes the state of the system CPU from the standby state to an active state. Such standby power consumption is an obstacle to achieve a long battery life.

Figure 2:
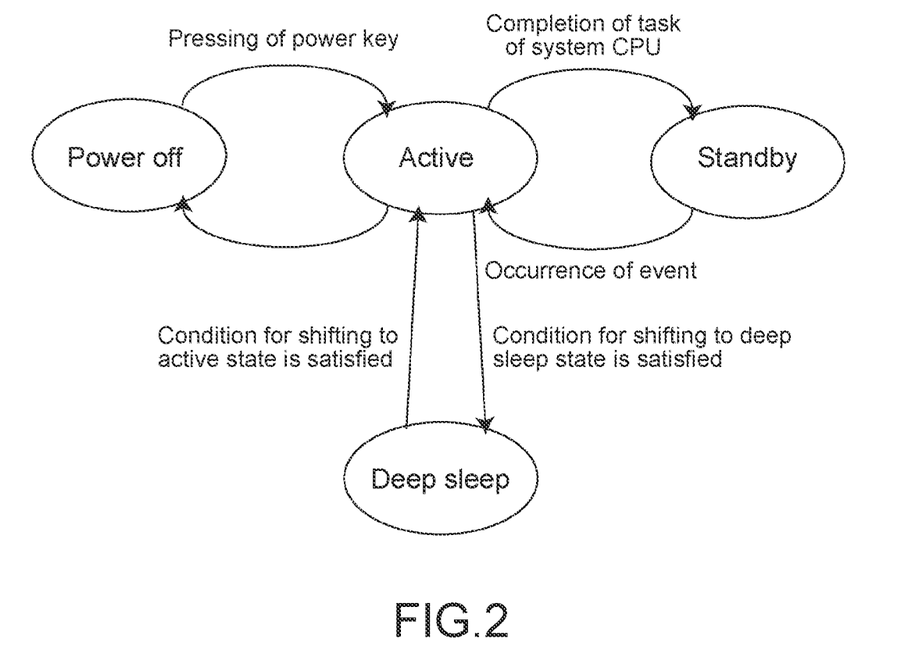
FIG. 2 illustrates a change in a state of a system CPU that is included in an IoT apparatus according to the present technology.

As illustrated in FIG. 2, an IoT apparatus of the present embodiment is configured such that the state of a system CPU can be switched between an active state in which power is consumed, and a deep sleep state that is a no-power-usage state in which power is not consumed. In the IoT apparatus of the present embodiment, the occurrence of a first event that indicates the necessity of a shift of the state of the system CPU from the deep sleep state to the active state, is detected by an event detection module such as a sensor or a communication module. The event detection module activates a data request signal that is connected to the system CPU by connection pins when the occurrence of the first event is detected in a state in which the system CPU is in the deep sleep state. The data request signal is also connected to a power IC by connection pins through a gate circuit, and when the data request signal is activated, the power IC turns on power supplied to the system CPU, using an internal power-on logic. This results in the system CPU being started to enter the active state. As described above, the IoT apparatus of the present embodiment makes it possible to shift the state of a system CPU between the active state and the deep sleep state. In the deep sleep state, no power consumption occurs since the system CPU is off. This results in further prolonging a battery life of the IoT apparatus.

Further, in the case of the IoT apparatus of the present embodiment, the system CPU is off but the event detection modules such as a sensor and a communication module are on in the deep sleep state. Thus, when the system CPU and the event detection module are directly connected to each other by connection pins, a bias voltage from the event detection module such as a sensor or a communication module will be applied to the system CPU in the deep sleep state. This may result in breaking the CPU and causing an unnecessary current (energy) to flow out of the event detection module. In order to take measures against such issues, a power isolation logic is inserted between respective connection pins of the system CPU and the event detection module. The power isolation logic is configured to isolate the connection pin of the event detection module from the connection pin of the system CPU in the deep sleep state, and to cancel the isolation of the connection pin of the event detection module from the connection pin of the system CPU in the active state, such that the connection pins are connected to each other.

Configuration of IoT Apparatus 1 of Present Embodiment

Next, a configuration and an operation of an IoT apparatus 1 of the present embodiment are described in more detail.

Figure 3:
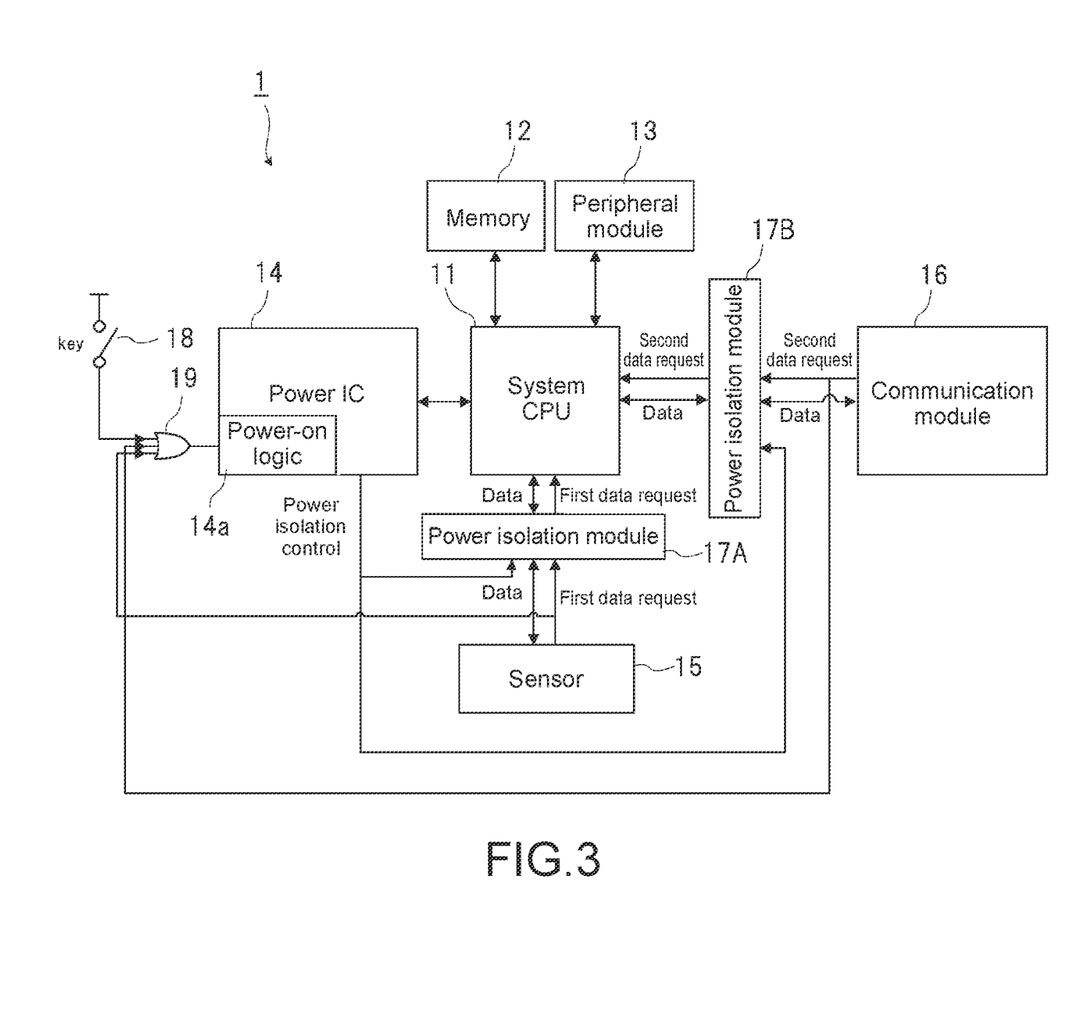
FIG. 3 is a block diagram illustrating a hardware configuration of an IoT apparatus 1 according to a first embodiment of the present technology.

FIG. 3 is a block diagram illustrating a hardware configuration of the IoT apparatus 1 according to a first embodiment of the present technology. The IoT apparatus 1 detects a state (such as the environment, a motion, and a location)

of a monitoring-and-observation target to perform upload transmission of the detected state to an external apparatus through a network. The external apparatus can store data uploaded by the IoT apparatus 1 and confirm the state of the monitoring-and-observation target.

As illustrated in FIG. 3, the IoT apparatus 1 includes a system CPU 11, a memory 12, a peripheral module 13, a power integrated circuit (IC) 14, a sensor 15, a communication module 16, a first power-isolation module 17A, a second power-isolation module 17B, a system switch 18, and a gate circuit 19.

The system CPU 11 controls respective sections that are included in the IoT apparatus 1, and performs various computation processes such as data processing that corresponds to a detected event.

The memory 12 stores therein, for example, a program that is necessary for an operation of the system CPU 11, and provides a working region used for computation performed by the system CPU 11.

The peripheral module 13 is various apparatuses that are used by being connected to the system CPU 11, and examples of the peripheral module 13 include a reader/writer for a storage device that stores therein data, and an interface for another apparatus (such as a Global Positioning System (GPS) receiver).

The sensor 15 is a detector used to detect a state (such as the environment, a motion, and a location) of a monitoring-and-observation target, and examples of the sensor 15 include a gyroscope, an acceleration sensor, a temperature sensor, a humidity sensor, and a pressure sensor.

The sensor 15 is also on when the system CPU 11 is in the deep sleep state, and can continuously detect a state of a monitoring-and-observation target. The sensor 15 includes a circuit that activates a first data-request signal connected to the system CPU 11 by connection pins when an event such as a motion or a temperature that exhibits a value greater than a threshold is detected by the sensor 15.

The communication module 16 is a module used to cause the IoT apparatus 1 to communicate with another apparatus through a network. The communication module 16 is also on when the system CPU 11 is in the deep sleep state. The communication module 16 includes a circuit that activates a second data-request signal connected to the system CPU 11 by connection pins when the communication module 16 receives, from a network side, a request for data generated by the system CPU 11, or when the communication module 16 receives a request that external data on a network be acquired.

Further, the communication module 16 holds setting information that is used for communication and is set by the system CPU 11. The communication module 16 is configured to enable states of the system CPU 11 and the communication module 16 to be synchronized with each other by reporting the setting information used for communication and its own dynamically changing changeable information to the system CPU 11 having been restarted in the deep sleep state and having entered the active state.

The system switch 18 is a switch for which an opening-and-closing operation is performed by a user. An operation of switching the state of the system switch 18 from an open state to a closed state is performed by the user when the state of the system CPU 11 is desired to be switched to an active state from a power-off state or a standby state.

The gate circuit 19 is a circuit that processes events using a logical sum, and reports a first event-occurrence signal to the power IC 14, where the events are an event in which the state of the system switch 18 is switched from an open state to a closed state, an event in which a first data-request signal from the sensor 15 to the system CPU 11 becomes active, and an event in which a second data-request signal from the communication module 16 to the system CPU 11 becomes active.

The power IC 14 is a circuit that supplies an operation power to each section included in the IoT apparatus 1. The power IC 14 may generate an operation power using a battery, or may generate an operation power from an external power supply. When the first event-occurrence signal from the gate circuit 19 is input to the power IC 14 in a state in which the system CPU 11 is in the deep sleep state, the power IC 14 performs control to turn on power supply to the system CPU 11 in order to shift the state of the system CPU 11 to the active state.

Further, when the first event-occurrence signal from the gate circuit 19 is input to the power IC 14 in the state in which the system CPU 11 is in the deep sleep state, the power IC 14 outputs, to the first power-isolation module 17A and the second power-isolation module 17B, respective power-isolation control signals respectively used to cancel isolation of a connection pin of the sensor 15 from a connection pin of the system CPU 11 that is performed by the first power-isolation module 17A and to cancel isolation of a connection pin of the communication module 16 from a connection pin of the system CPU 11 that is performed by the second power-isolation module 17B.

The first power-isolation module 17A is arranged between the respective connection pins of the system CPU 11 and the sensor 15. The first power-isolation module 17A is configured to isolate the connection pin of the sensor 15 from the corresponding connection pin of the system CPU 11 when the system CPU 11 is in the deep sleep state, and to connect the respective connection pins of the system CPU 11 and the sensor 15 to cancel the isolation when the system CPU 11 is in the active state or the standby state.

The second power-isolation module 17B is arranged between the respective connection pins of the system CPU 11 and the communication module 16. The second power-isolation module 17B is configured to isolate the connection pin of the communication module 16 from the corresponding connection pin of the system CPU 11 when the system CPU 11 is in the deep sleep state, and to connect the respective connection pins of the system CPU 11 and the communication module 16 to cancel the isolation when the system CPU 11 is in the active state or the standby state.

The connection/isolation states of each of the power isolation modules 17A and 17B are controlled on the basis of a power-isolation control signal generated by the power-on logic 14a included in the electric IC 14 according to an instruction given by the system CPU 11.

Operation of IoT Apparatus 1

Next, an operation of the IoT apparatus 1 is described in the following order.
1. Shift from the active state to the deep sleep state
2. Shift from the deep sleep state to the active state in response to data detected by the sensor 15
3. Shift from the deep sleep state to the active state in response to a data reception request from the communication module 16

Operation of Shifting from Active State to Deep Sleep State

Figure 4:
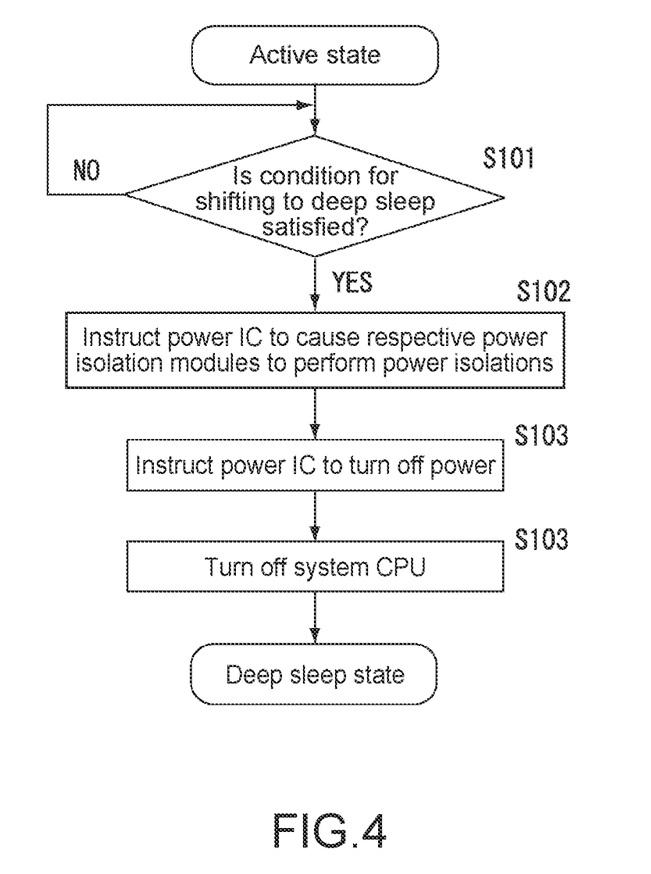
FIG. 4 is a flowchart illustrating a procedure of an operation of shifting from an active state to a deep sleep state.

FIG. 4 is a flowchart illustrating a procedure of an operation of shifting from the active state to the deep sleep state.

It is assumed that the system CPU 11 is currently in the active state. In the active state, each of the power isolation modules 17A and 17B has canceled isolation. In other words, the corresponding connection pins of the system CPU 11 and the sensor 15 are connected to each other, and the corresponding connection pins of the system CPU 11 and the communication module 16 are also connected to each other.

When a specified condition for shifting to deep sleep (a second event) is satisfied, that is, for example, when it is determined, on the basis of output of the sensor 15, that during a specific period of time, there has been no motion of the IoT apparatus 1, no task has been executed, and no task has been scheduled to be executed (YES in Step S101), the system CPU instructs the power IC 14 to cause the power isolation modules 17A and 17B to perform respective power isolations (Step S102), and instructs the power IC 14 to turn off power supply to the system CPU 11 (Step S103). Accordingly, the sensor 15 and the communication module 16 remain in an on state, and the system CPU 11 is turned off (Step S103). This results in completion of a shift to the deep sleep state.

Operation of Shifting from Deep Sleep State to Active State in Response to Data Detected by Sensor 15

Figure 5:
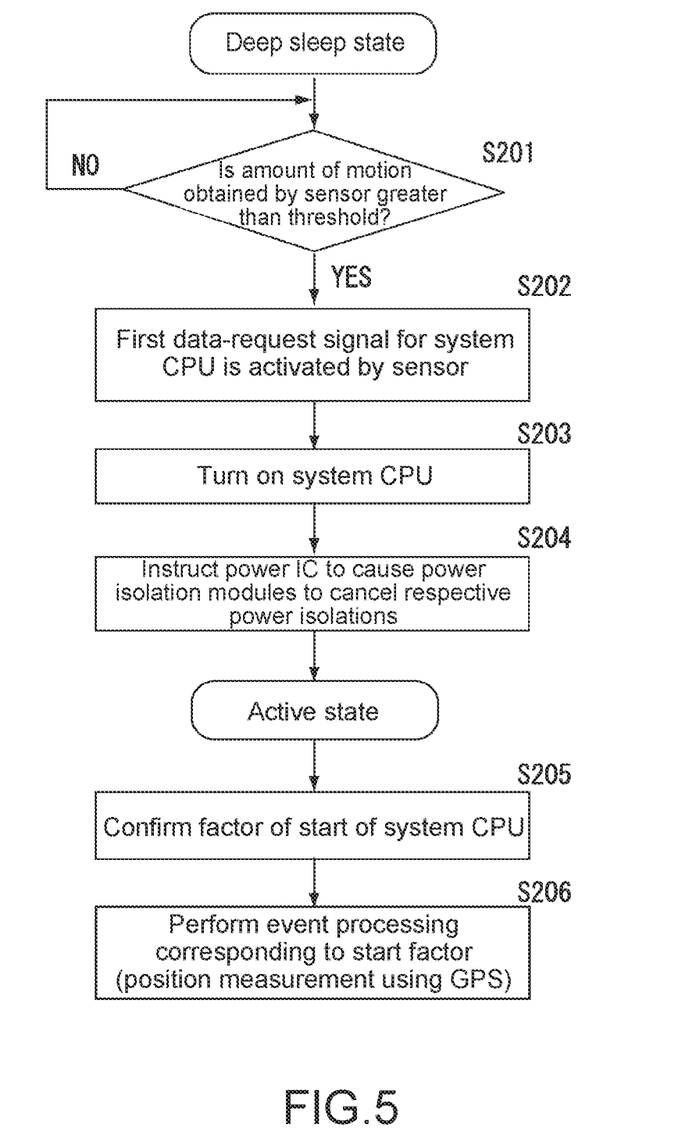
FIG. 5 is a flowchart illustrating an operation performed upon shifting from the deep sleep state to the active state in response to data detected by a sensor.

FIG. 5 is a flowchart illustrating an operation performed upon shifting from the deep sleep state to the active state in response to data detected by the sensor 15.

When a motion that exhibits a value greater than a threshold is detected by the sensor 15 due to, for example, a user who carries the IoT apparatus 1 starting to move (YES in Step S201), the sensor 15 activates a first data-request signal that is connected to the system CPU 11 by connection pins (Step S202).

When the first data-request signal is activated, a first event signal from the gate circuit 19 to the power IC 14 is activated, and, in response to this, the power IC 14 turns on power supply to the system CPU 11 (Step S203). Consequently, the system CPU 11 starts booting. After being started, the system CPU 11 instructs the power IC 14 to cause the power isolation modules 17A and 17B to cancel the respective power isolations (Step S204). In response to receiving the instruction to cancel the power isolations, the power IC 14 outputs, to the power isolation modules 17A and 17B, respective power-isolation control signals used to cancel the power isolations. Consequently, isolation of the connection pin of the sensor 15 from the connection pin of the system CPU 11 that is performed by the first power-isolation module 17A, and isolation of the connection pin of the communication module 16 from the connection pin of the system CPU 11 that is performed by the second power-isolation module 17B are canceled. This results in completion of a shift to the active state.

When the system CPU 11 enters the active state, the system CPU 11 checks a start factor. In this operation example, from, for example, the fact that the first data-request signal is active and the status is read from the sensor 15, the system CPU 11 can recognize, as the start factor, data detected by the sensor 15, that is, a movement of a user (Step S205).

When the system CPU 11 recognizes the movement of the user as the start factor, the system CPU 11 performs event processing corresponding to the start factor, such as processing including starting, for example, position measurement using GPS, and storing positioning data in, for example, the memory 12 (Step S206).

Operation of Shifting from Deep Sleep State to Active State in Response to Data Transmission/Reception Request from Communication Module 16

Figure 6:
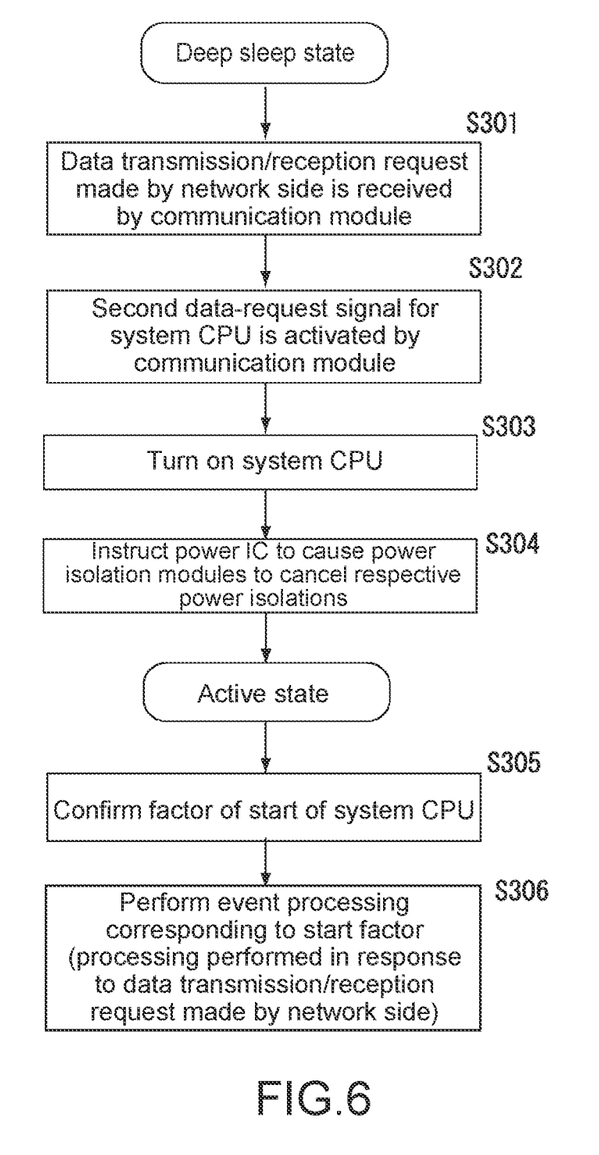
FIG. 6 is a flowchart illustrating an operation performed upon shifting from the deep sleep state to the active state in response to a data transmission/reception request from the communication module 16.

FIG. 6 is a flowchart illustrating an operation performed upon shifting from a deep sleep state to an active state in response to a data transmission/reception request from the communication module 16.

When the communication module 16 receives, from a network side, a request for data generated by the system CPU 11 (Step S301), or when the communication module 16 receives a request that external data on a network be acquired, the communication module 16 activates a second data-request signal connected to the system CPU 11 by connection pins (Step S302).

When the second data-request signal is activated, a first event signal from the gate circuit 19 to the power IC 14 is activated, and, in response to this, the power IC 14 turns on power supply to the system CPU 11 (Step S303). Consequently, the system CPU 11 starts booting. After being started, the system CPU 11 instructs the power IC 14 to cause the power isolation modules 17A and 17B to cancel the respective power isolations (Step S304). In response to receiving the instruction to cancel the power isolations, the power IC 14 outputs, to the power isolation modules 17A and 17B, respective power-isolation control signals used to cancel the power isolations. Consequently, isolation of the connection pin of the sensor 15 from the connection pin of the system CPU 11 that is performed by the first power-isolation module 17A, and isolation of the connection pin of the communication module 16 from the connection pin of the system CPU 11 that is performed by the second power-isolation module 17B are canceled. This results in completion of a shift to the active state.

When the system CPU 11 enters the active state, the system CPU 11 checks a start factor. In this operation example, from, for example, the fact that the second data-request signal is active and the status is read from the communication module, the system CPU 11 can recognize, as the start factor, a data transmission/reception request from the communication module 16 (Step S305).

When the system CPU 11 recognizes, as the start factor, the data transmission/reception request from the communication module 16, the system CPU 11 performs event processing corresponding to the start factor, such as processing of performing update transmission of latest GPS positioning data stored in, for example, the memory 12 to an external apparatus using the communication module 16 (Step S306).

A history of a movement of a user who carries the IoT apparatus 1 can be collected in an external apparatus by performing the storing of GPS positioning data, which is event processing performed in response to a motion of the user, and by performing the update transmission of the GPS positioning data to the external apparatus or a cloud, which is performed in response to a data transmission/reception request from the communication module 16.

Here, various information terminals, such as a smartphone, a tablet terminal, a personal computer, and a dedicated information processing terminal, that include display functions can be used as the external apparatus.

FIGS. 7 to 10 illustrate examples of a UI screen of a user movement history that is displayed on a display of an external apparatus.

Figure 7:
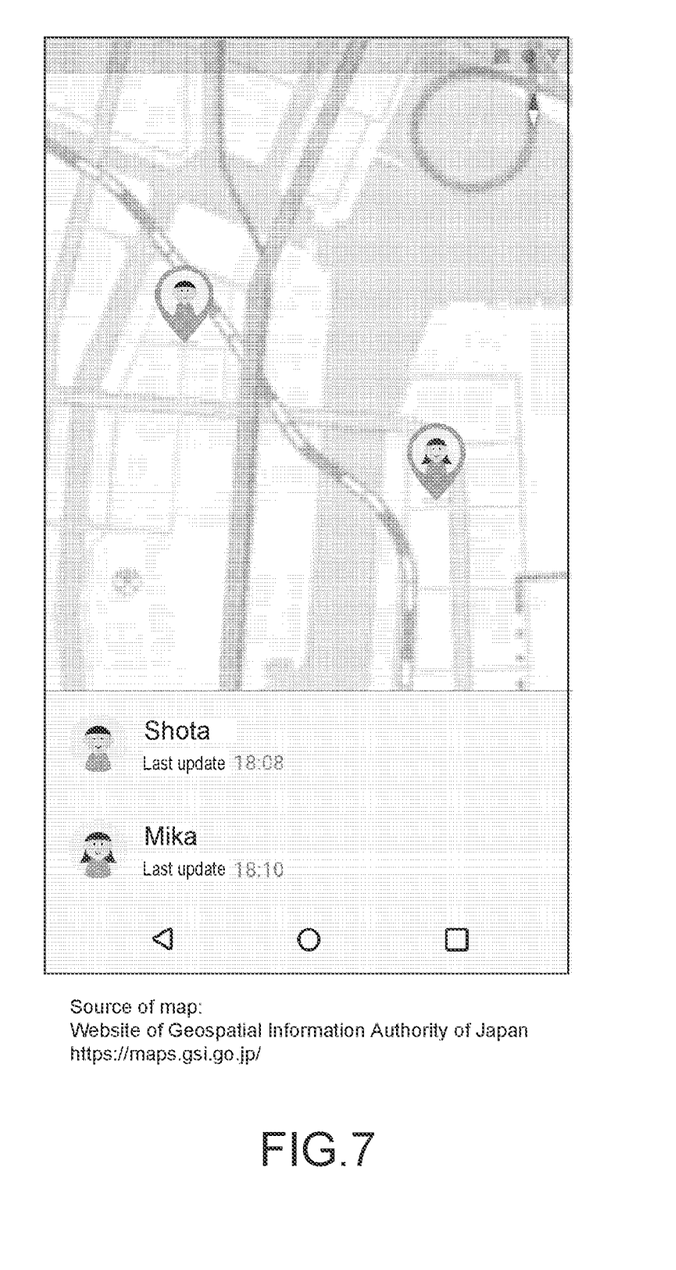
FIG. 7 illustrates an example of an UI screen of a history of a movement of a user, the history of the movement of the user being displayed on a display of an external apparatus.
Figure 8:
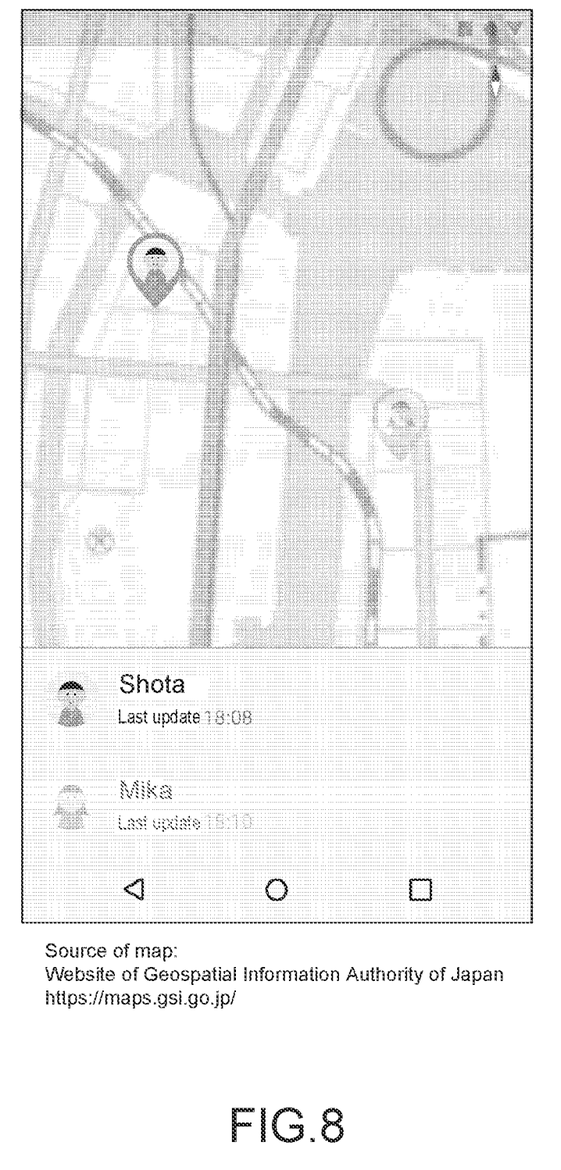
FIG. 8 illustrates an example of the UI screen indicating a state of the system CPU.

On the UI screen, user marks M1 and M2 that each indicate a location of a user who carries the IoT apparatus 1 are arranged on a map 21. Locations, on the map 21, in which the user marks M1 and M2 are arranged are each calculated on the basis of GPS positioning data most recently transmitted from the IoT apparatus 1. On the UI screen, a difference between the user marks M1 and M2 in how to display is set such that a user of the external apparatus can grasp at a glance whether the IoT apparatus 1 of each user is in the deep sleep state or the active state, for example, as illustrated in FIGS. 7 and 8. There is an approach of setting a difference between the user marks M1 and M2 in, for example, a degree of transparency of display, for example, as illustrated in FIG. 8.

When the IoT apparatus 1 enters the deep sleep state, the IoT apparatus 1 transmits data to report that the IoT apparatus 1 will enter the deep sleep state. The external apparatus or a cloud can determine, from the transmitted data, whether the IoT apparatus 1 is in the deep sleep state.

Figure 9:
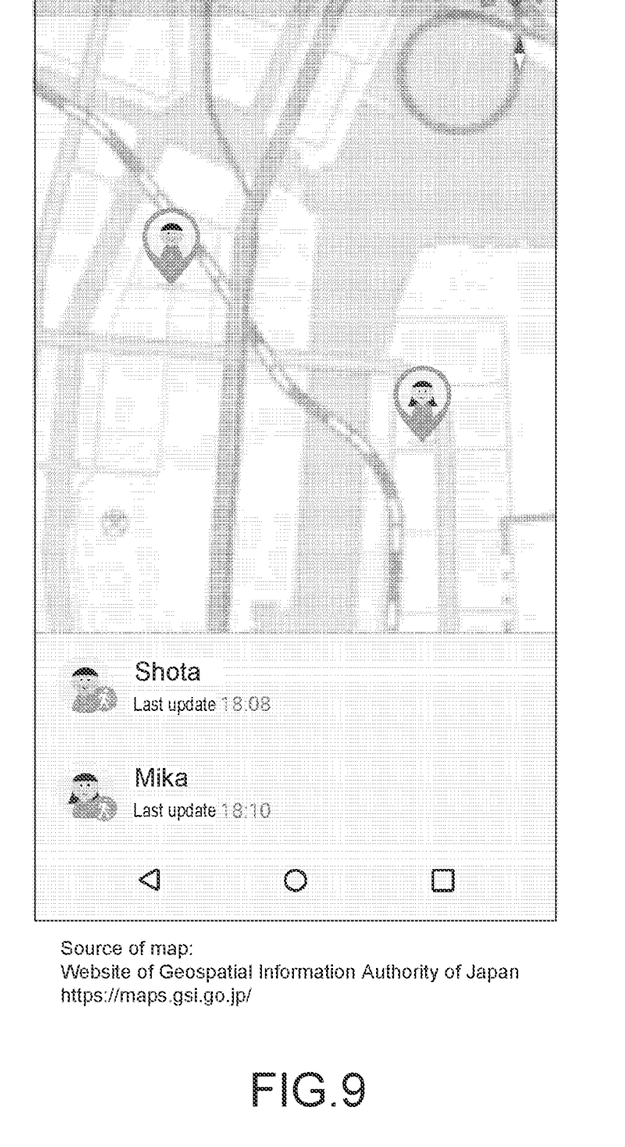
FIG. 9 illustrates an example of the UI screen indicating a state of the movement of the user.

Further, whether the user is moving may be displayed on the UI screen, for example, as indicated using a region 22 for displaying detailed user information in FIG. 9. Whether the user is moving can be estimated on the basis of a difference between a plurality of pieces of GPS positioning data consecutively acquired by the external apparatus from the IoT apparatus 1. Furthermore, the external apparatus may determine, for example, a moving speed and a way of moving (on foot/by bicycle/by automobile) of the user from the difference between the plurality of pieces of GPS positioning data consecutively acquired from the IoT apparatus 1, and may reflect a result 23 of the determination in the UI screen. The UI screen of FIG. 9 indicates that two users are currently moving on foot.

Figure 10:
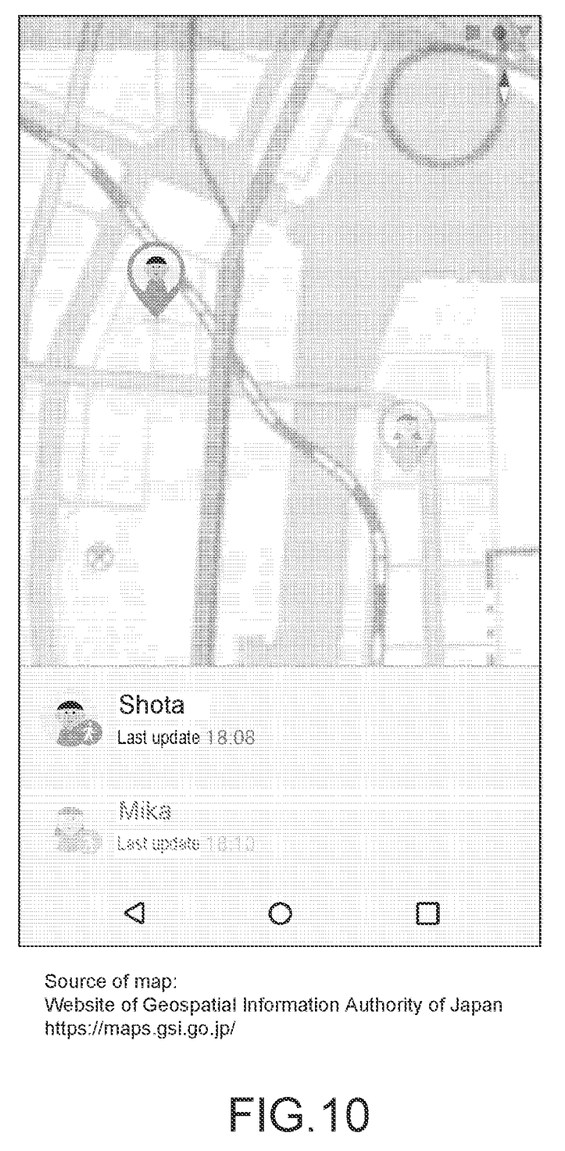
FIG. 10 illustrates an example of the UI screen indicating the state of the system CPU and the state of the movement of the user.

In FIG. 10, one of the users is moving on foot and the IoT apparatus 1 carried by the one of the users is in the active state, whereas another of the users is moving on foot and the IoT apparatus 1 carried by the other of the users is in the deep sleep state. This is indicated by increasing the degree of transparency.

As described above, the present embodiment makes it possible to ensure as long a period of time as possible for which a trigger used in order for the system CPU 11 to enter the active state can be continuously monitored and power consumption of the system CPU 11 can be suppressed to zero. This results in being able to obtain the IoT apparatus 1 providing a greater power-saving effect.

Supplement and Modifications

In the embodiment described above, the state of the system CPU 11 is shifted from the deep sleep state to the active state in response to a motion detection performed by the sensor 15 and a reception request from the communication module 16. However, for example, the state of the system CPU 11 may be shifted from the deep sleep state to the active state in response to a timer-interrupt, that is, for example, with a specified period of time, and upload transmission of data held in, for example, the memory 12 to an external apparatus or a cloud may be performed. In other words, in the deep sleep state, the system CPU 11 may detect a timer interrupt as a first event every time the timer interrupt occurs, that is, for example, every time a specified period of time elapses. Then, the system CPU 11 may instruct the power IC 14 to turn on power, and may cause the power IC 14 to cause isolations performed by the power isolation modules 17A and 17B to be canceled.

The communication module 16 may be configured such that, when the communication module 16 fails to get back into operation in a state in which the system CPU 11 is in the deep sleep state, the communication module 16 causes the state of the system CPU 11 to be shifted to the active state, and is caused to be restarted under the control of the system CPU 11.

The embodiment in which the information processing apparatus according to the present technology is applied to an IoT apparatus has been described above. However, the information processing apparatus according to the present technology is not limited to being applied to an IoT apparatus. The information processing apparatus according to the present technology can be applied to various other apparatuses, and is of particular usefulness to general apparatuses kept in a standby state over a long period of time.

For example, the information processing apparatus according to the present technology can be used for an apparatus that is placed in public facilities such as a station and an automatic vending place and used as a telephone terminal in emergency. It is also sufficient if such a telephone terminal is in the deep sleep state when the telephone terminal is not in use and enters the active state by a user pressing, for example, a button or a dial button that is used for starting of use in order to use the terminal.

Further, the information processing apparatus according to the present technology may be configured as an installation-type terminal, and the state may be shifted from the deep sleep state to the active state in response to being accessed by a centrally managed apparatus through a network in order to perform modification such as updating data. More specifically, the present technology can be applied to, for example, a display apparatus that is placed in, for example, a large electrical appliance store and displays, for example, a product price list. When there is a change in a price of a product, price data of the product is transmitted from the centrally managed apparatus through the network. In response to the display apparatus receiving the price data, the state of the display apparatus is shifted from the deep sleep state to the active state, and the display apparatus displays the product price list including the updated price data.

Note that the present technology may also take the following configurations.

(1) An information processing apparatus, including: a computation processing circuit of which a state is capable of being switched at least between an active state in which power is consumed, and a no-power-usage state in which power is not consumed; an event detection module that detects a first event used to shift the state of the computation processing circuit from the no-power-usage state to the active state; a power isolation circuit that isolates power of the event detection module from power of the computation processing circuit in the no-power-usage state; and an isolation canceling circuit that cancels, in the active state, the isolation performed by the power isolation circuit.

(2) The information processing apparatus according to (1), in which the information processing apparatus is configured such that, when the first event is detected by the event detection module, the computation processing circuit is turned on, and the isolation canceling circuit cancels the isolation performed by the power isolation circuit.

(3) The information processing apparatus according to (1) or (2), in which the event detection module is a communication module used to communicate with a network, and the event detection module is configured to determine reception of a request as the first event, the request being a request that is received from a side of the network and is a request for data generated by the computation processing circuit, or a request that external data on the network be acquired.

(4) The information processing apparatus according to (3), in which the communication module holds at least setting information that is used for communication and is set by the computation processing circuit, and changeable information that dynamically changes in the communication module, and the communication module is configured to provide the setting information and the changeable information to the computation processing circuit when the state of the computation processing circuit is shifted from the no-power-usage state to the active state.

(5) The information processing apparatus according to any one of (1) to (4), in which the event detection module includes a sensor, and the event detection module is configured to determine occurrence of the first event on the basis of a value of detection performed by the sensor.

(6) The information processing apparatus according to (5), in which the sensor is a sensor that detects a motion, and is configured to determine, as the first event, detection of a motion that exhibits a value greater than a specified value.

(7) The information processing apparatus according to (5), in which the sensor is a sensor that detects a temperature, and is configured to determine, as the first event, detection of a temperature that exhibits a value greater than a specified value.

(8) The information processing apparatus according to any one of (1) to (7), in which the event detection module is configured to determine, as the first event, an operation of a switch that is performed by a user.

(9) The information processing apparatus according to any one of (1) to (7), in which the event detection module is configured to determine a timer interrupt as the first event.

(10) The information processing apparatus according to any one of (1) to (9), in which the event detection module is configured to detect a second event used to shift the state of the computation processing circuit to the no-power-usage state, and the isolation canceling circuit is configured to isolate, upon the detection of the second event, power of the event detection module from power of the computation processing circuit.

(11) The information processing apparatus according to any one of (1) to (10), in which the communication module is configured such that, when the communication module fails to get back into operation in a state in which the computation processing circuit is in the no-power-usage state, the communication module causes the state of the computation processing circuit to be shifted to the active state, and is caused to be restarted under the control of the computation processing circuit.

(12) The information processing apparatus according to any one of (1) to (11), in which the computation processing circuit is configured to determine a type of the occurring first event, and to perform processing corresponding to the determined type of the first event.

(13) An information processing method, including: isolating power of an event detection module from power of a computation processing circuit in a no-power-usage state in which power is not consumed, the computation processing circuit being a circuit of which a state is capable of being switched at least between an active state in which power is consumed, and the no-power-usage state, the event detection module detecting a first event used to shift the state of the computation processing circuit from the no-power-usage state to the active state; and when the first event is detected by the event detection module, turning on the computation processing circuit to cause the state of the computation processing circuit to be shifted to the active state, and canceling the isolation.

(14) The information processing method according to (13), in which the event detection module is a communication module used to communicate with a network, and the event detection module determines reception of a request as the first event, the request being a request that is received from a side of the network and is a request for data generated by the computation processing circuit, or a request that external data on the network be acquired.

(15) The information processing method according to (13), in which the communication module holds at least setting information that is used for communication and is set by the computation processing circuit, and changeable information that dynamically changes in the communication module, and the communication module provides the setting information and the changeable information to the computation processing circuit when the state of the computation processing circuit is shifted from the no-power-usage state to the active state.

(16) The information processing method according to any one of (13) to (15), in which the event detection module includes a sensor, and determines occurrence of the first event on the basis of a value of detection performed by the sensor.

(17) The information processing method according to (16), in which the sensor is a sensor that detects a motion, and determines, as the first event, detection of a motion that exhibits a value greater than a specified value.

(18) The information processing method according to (16), in which the sensor is a sensor that detects a temperature, and determines, as the first event, detection of a temperature that exhibits a value greater than a specified value.

(19) The information processing method according to any one of (13) to (18), in which the event detection module determines, as the first event, an operation of a switch that is performed by a user.

(20) The information processing method according to any one of (13) to (18), in which the event detection module determines a timer interrupt as the first event.

(21) The information processing method according to any one of (13) to (20), in which the event detection module is configured to detect a second event used to shift the state of the computation processing circuit to the no-power-usage state, and the isolation canceling circuit isolates, upon the detection of the second event, power of the event detection module from power of the computation processing circuit.

(22) The information processing method according to any one of (13) to (21), in which when the communication module fails to get back into operation in a state in which the computation processing circuit is in the no-power-usage state, the communication module causes the state of the computation processing circuit to be shifted to the active state, and the computation processing circuit restarts the communication module.

(23) The information processing method according to any one of (13) to (22), in which the computation processing circuit determines a type of the occurring first event, and performs processing corresponding to the determined type of the first event.

REFERENCE SIGNS LIST 1 video system
10 camera system 11 image-capturing apparatus
12 camera control unit
13 camera cable
20 video converter
30 primary transmission line
35 output transmission line
114 CPU
121 transmission section
122 HDR process section
123 SDR process section
124 CPU
201 inverse HDR process section
202 SDR process section
203 CPU

The invention claimed is:

1. An information processing apparatus, comprising:
a computation processing circuit configured to set one of an active state in which a power is consumed by the computation processing circuit, and a power-saving state in which the power is not consumed by the computation processing circuit; and
an event detection module configured to:
communicate with an external apparatus via a network; and
determine, as a first event, a reception of a signal received from the external apparatus via a side of the network, wherein
the computation processing circuit is changed from the power-saving state to the active state based on the determination of the first event, and
the event detection module receives power from a power supply unit in the power-saving state.

2. The information processing apparatus according to claim 1, further comprising a power isolation circuit configured to isolate the power of the event detection module from the power of the computation processing circuit in the power-saving state.

3. The information processing apparatus according to claim 2, further comprising an isolation canceling circuit configured to cancel, in the active state, the isolation by the power isolation circuit.

4. The information processing apparatus according to claim 1, wherein the event detection module is a communication module which is further configured to:
hold at least setting information that is used for communication, wherein the setting information is set by the computation processing circuit;
hold changeable information that dynamically changes in the communication module; and
provide the setting information and the changeable information to the computation processing circuit when the computation processing circuit is switched from the power-saving state to the active state.

5. The information processing apparatus according to claim 1, wherein
the event detection module includes a sensor, and
the event detection module is further configured to determine an occurrence of the first event based on a value of a state of target detected by the sensor.

6. The information processing apparatus according to claim 5, wherein the sensor is configured to:
detect a motion of the target; and
determine, as the first event, the detection of the motion based on a value of the motion being greater than a specified value.

7. The information processing apparatus according to claim 5, wherein the sensor is configured to:
detect a temperature associated with the target, and
determine, as the first event, the detection of the temperature based on a value of the temperature being greater than a specified value.

8. The information processing apparatus according to claim 1, wherein the event detection module is further configured to determine, as the first event, an operation of a switch performed by a user.

9. The information processing apparatus according to claim 1, wherein the event detection module is further configured to determine a timer interrupt as the first event.

10. The information processing apparatus according to claim 2, wherein
the event detection module is further configured to detect a second event used to switch the computation processing circuit from the active state to the power-saving state, and
the power isolation circuit is further configured to isolate, upon the detection of the second event, the power of the event detection module from the power of the computation processing circuit.

11. The information processing apparatus according to claim 1, wherein the event detection module is a communication module which is configured to cause, based on failure of the communication module to get back into operation in a state in which the computation processing circuit is in the power-saving state, the computation processing circuit to be switched to the active state, wherein the communication module is restarted under a control of the computation processing circuit.

12. The information processing apparatus according to claim 1, wherein the computation processing circuit is further configured to:
determine a type of the first event, and
perform processing corresponding to the determined type of the first event.

13. An information processing method, comprising:
isolating a power of an event detection module from a power of a computation processing circuit in a power-saving state in which power is not consumed, wherein the computation processing circuit switches between an active state in which the power is consumed, and the power-saving state;
communicating with an external apparatus via a network;
determining, as a first event, a reception of a signal received from the external apparatus via a side of the network, wherein the signal is for data generated by the computation processing circuit;
switching the computation processing circuit from the power-saving state to the active state based on the determination of the first event; and
canceling the isolation based on the switching of the computation processing circuit to the active state.

14. The information processing method according to claim 13, further comprising:
holding at least setting information that is used for communication, wherein the setting information is set by the computation processing circuit;
holding changeable information that dynamically changes in the event detection module, wherein the event detection module is a communication module; and
providing the setting information and the changeable information to the computation processing circuit when the computation processing circuit is switched from the power-saving state to the active state.

15. The information processing method according to claim 13, wherein the event detection module includes a sensor.

16. The information processing method according to claim 15, further comprising determining an occurrence of the first event based on a value of a state of target detected by the sensor.

17. The information processing method according to claim 16, further comprising:
   detecting, by the sensor, a motion of the target; and
   determining, as the first event, the detection of the motion based on a value of the motion being greater than a specified value.

18. The information processing method according to claim 16, further comprising:
   detecting, by the sensor, a temperature associated with the target, and
   determining, as the first event, the detection of the temperature based on a value of the temperature being greater than a specified value.

19. The information processing method according to claim 13, further comprising determining, as the first event, an operation of a switch performed by a user.

20. The information processing method according to claim 13, further comprising determining a timer interrupt as the first event.

* * * * *